US012651789B2

(12) United States Patent
Park et al.

(10) Patent No.: US 12,651,789 B2
(45) Date of Patent: Jun. 9, 2026

(54) BATTERY CELL AND MANUFACTURING METHOD THEREOF

(71) Applicant: LG Energy Solution, Ltd., Seoul (KR)

(72) Inventors: Jin Yong Park, Daejeon (KR); Hangjune Choi, Daejeon (KR); Jeong Oh Moon, Daejeon (KR); Ho June Chi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 503 days.

(21) Appl. No.: 17/928,802

(22) PCT Filed: Jul. 22, 2021

(86) PCT No.: PCT/KR2021/009485
§ 371 (c)(1),
(2) Date: Nov. 30, 2022

(87) PCT Pub. No.: WO2022/065652
PCT Pub. Date: Mar. 31, 2022

(65) Prior Publication Data
US 2023/0275291 A1 Aug. 31, 2023

(30) Foreign Application Priority Data

Sep. 23, 2020 (KR) ........................ 10-2020-0122722

(51) Int. Cl.
*H01M 50/105* (2021.01)
*H01M 50/119* (2021.01)
(52) U.S. Cl.
CPC ....... *H01M 50/105* (2021.01); *H01M 50/119* (2021.01)

(58) Field of Classification Search
CPC ......................... H01M 50/105; H01M 50/119
See application file for complete search history.

(56) References Cited

U.S. PATENT DOCUMENTS

2018/0219245 A1* 8/2018 Choi ................... H01M 10/045
2019/0305261 A1 10/2019 Kim et al.
2019/0393452 A1 12/2019 Kim et al.
2020/0280044 A1 9/2020 Park et al.
(Continued)

FOREIGN PATENT DOCUMENTS

CN 1992380 A 7/2007
CN 105322106 A 2/2016
EP 3321991 A1 5/2018
(Continued)

OTHER PUBLICATIONS

Search Report dated Nov. 27, 2023 from the Office Action for Chinese Application No. 202180007584.3 issued Nov. 30, 2023, 2 pages. [See p. 1, categorizing the cited references].
(Continued)

*Primary Examiner* — Jane J Rhee
(74) *Attorney, Agent, or Firm* — Lerner David LLP

(57) ABSTRACT

A battery cell according to one embodiment of the present disclosure includes an electrode assembly including a positive electrode, a negative electrode, and a separator; and a pouch case in which a recessed portion for housing the electrode assembly is formed, wherein the pouch case is bent on the basis of at least one edge line among the edges formed by the recessed portion.

5 Claims, 4 Drawing Sheets

(56)        References Cited

U.S. PATENT DOCUMENTS

2021/0288360  A1      9/2021  Kim et al.
2022/0115687  A1      4/2022  Choi et al.

FOREIGN PATENT DOCUMENTS

| | | | |
|---|---|---|---|
| JP | 3070035 | U | 7/2000 |
| JP | 2002260600 | A | 9/2002 |
| JP | 2013206678 | A | 10/2013 |
| JP | 2016031829 | A | 3/2016 |
| KR | 20070075705 | A | 7/2007 |
| KR | 20130064465 | A | 6/2013 |
| KR | 20160077871 | A | 7/2016 |
| KR | 20170089276 | A | 8/2017 |
| KR | 20180083124 | A | 7/2018 |
| KR | 20190038094 | A | 4/2019 |
| KR | 20190106473 | A | 9/2019 |
| KR | 20190114645 | A | 10/2019 |
| KR | 20200000321 | A | 1/2020 |
| KR | 20200011404 | A | 2/2020 |
| KR | 20200103473 | A | 9/2020 |

OTHER PUBLICATIONS

Extended European Search Report including Written Opinion for Application No. 21872685.9 dated Jun. 12, 2024, pp. 1-10.
International Search Report for Application No. PCT/KR2021/009485 mailed Nov. 5, 2021, pp. 1-3.

* cited by examiner

【FIG. 1】
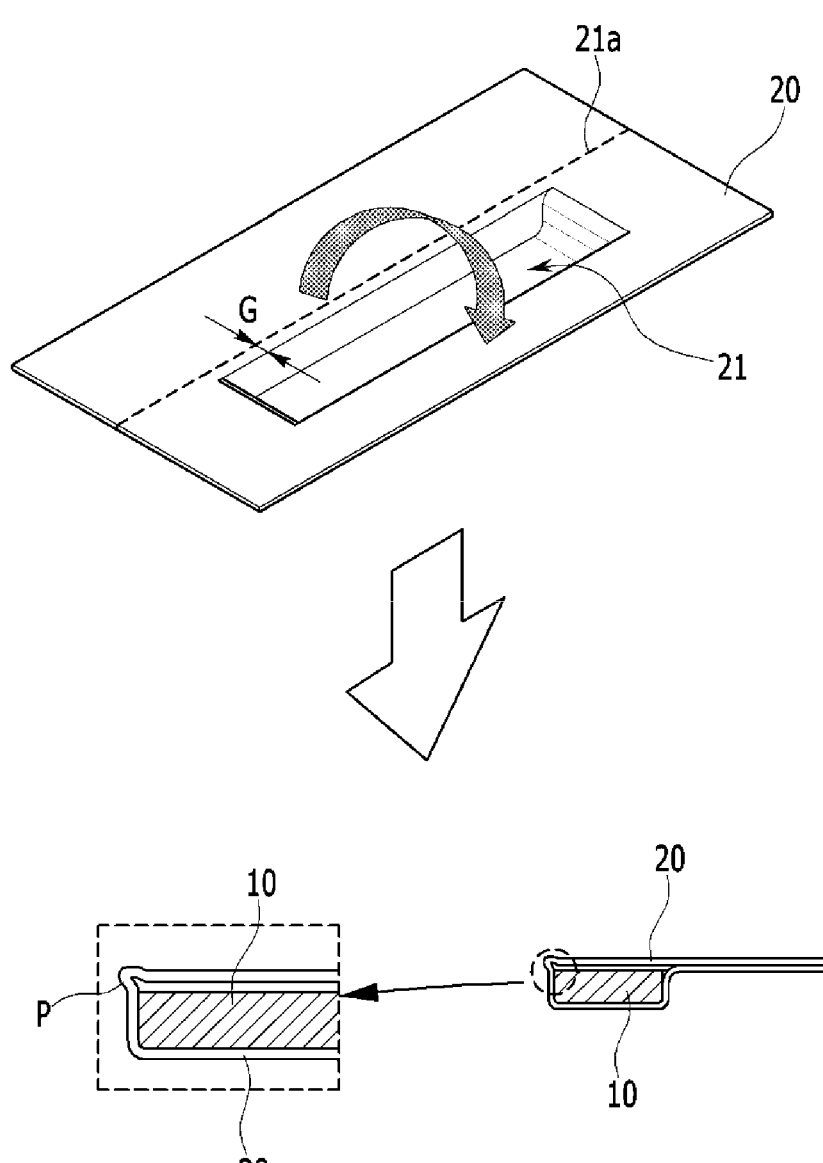

【FIG. 2】
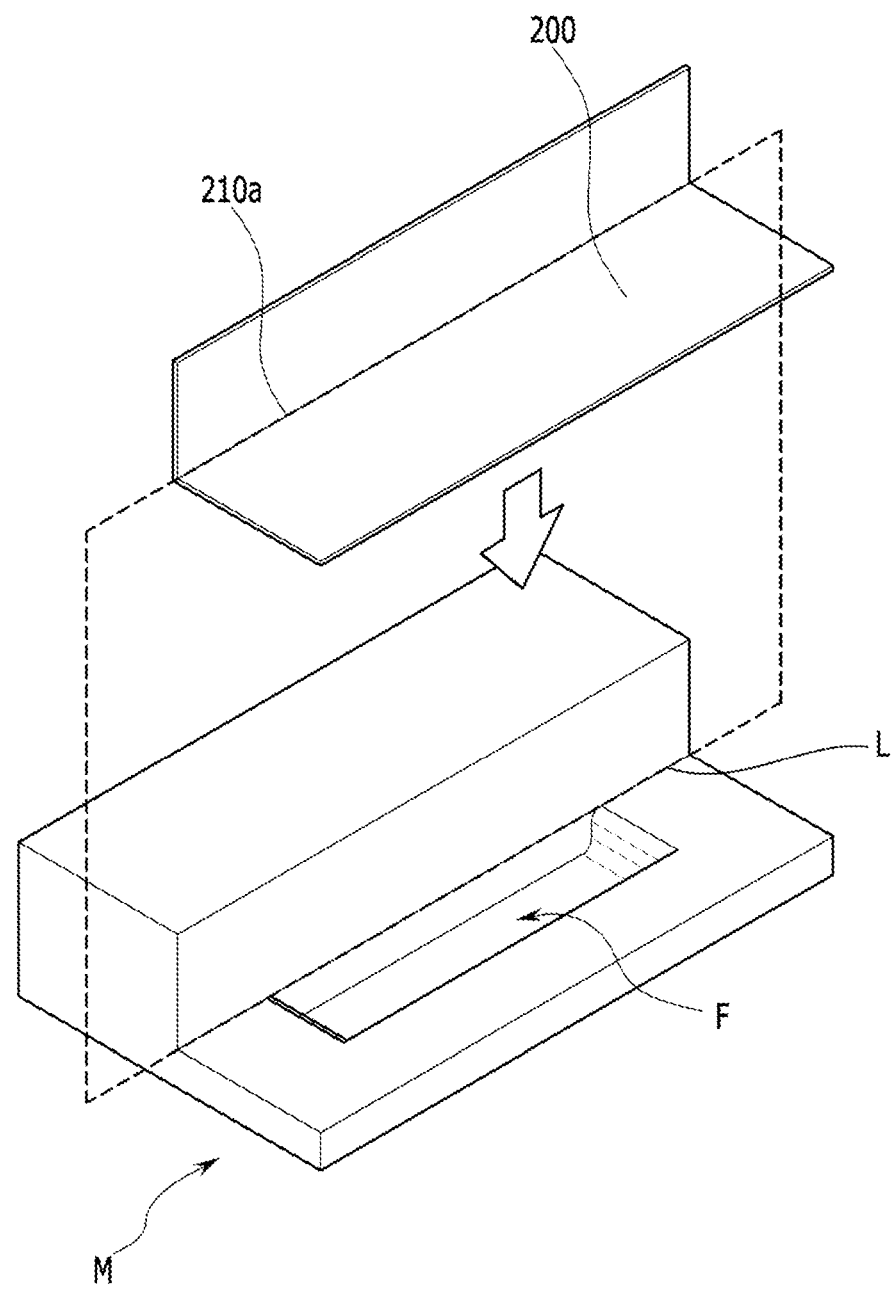

【FIG. 3】
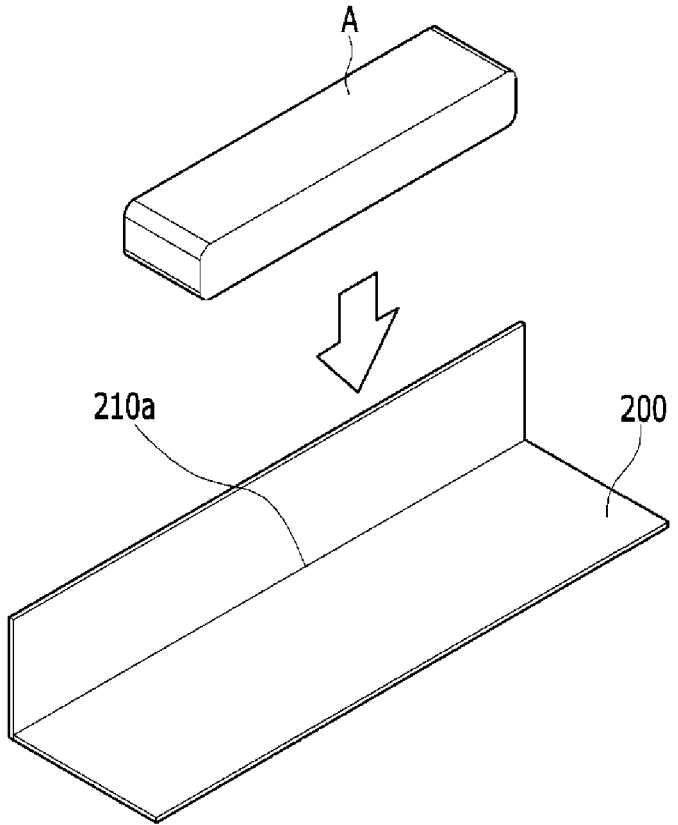
【FIG. 4】
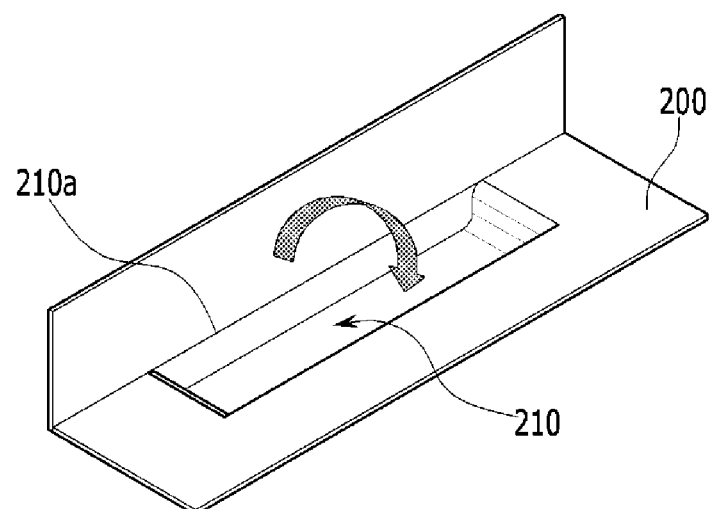

【FIG. 5】
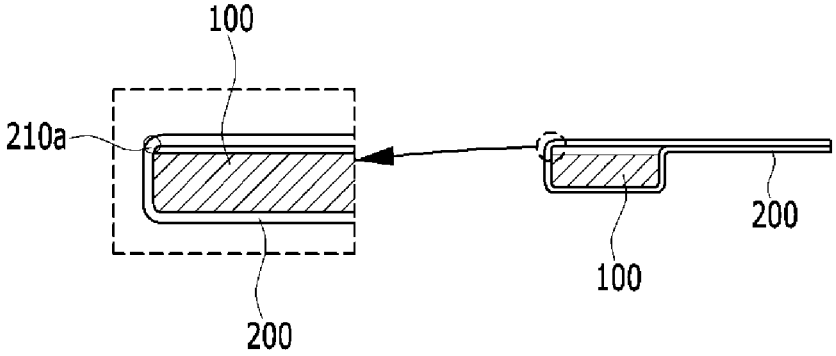

BATTERY CELL AND MANUFACTURING METHOD THEREOF

CROSS-REFERENCE TO RELATED APPLICATIONS

This application is a national stage entry under 35 U.S.C. § 371 of International Application No. PCT/KR2021/009485, filed on Jul. 22, 2021, which claims priority to Korean Patent Application No. 10-2020-0122722, filed on Sep. 23, 2020, the disclosures of which are hereby incorporated herein by reference in their entireties.

The present disclosure relates to a battery cell and a manufacturing method thereof, and more particularly, to a pouch-type battery cell and a manufacturing method thereof.

BACKGROUND

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, a method of configuring a battery module composed of at least one battery cell and then adding other components to at least one battery module to configure a battery pack is common.

The battery cell inserted so as to be stacked on the battery module includes an electrode assembly including a positive electrode, a negative electrode and a separator, and a pouch case in which a recessed part formed for housing the electrode assembly is formed.

In the case of a pouch-type battery cell, a draw forming shape was applied so that the electrode assembly could be inserted into a pouch case formed of an aluminum or metal thin plate using a mold, thereby forming a recessed portion in the pouch case. In the process of forming the recessed portion, the pouch case to which the draw forming is applied is bent by 180 degrees, and then the outer plane portion is sealed to form the battery cell in a watertight and airtight manner.

At this time, when the forming is applied to the pouch case, a residual stress may occur in the peripheral edge portion, and in the process of bending the pouch, the residual stress may cause deformation of a shape different from that of the design. This may be called a so-called bat-ear portion. Further, the degree of protrusion to one side through the bat-ear portion may be called an edge-long.

FIG. 1 is a view showing the state of manufacturing a pouch case of a conventional battery cell.

The manufacturing process of the conventional pouch case will be described in more detail with reference to FIG. 1. At the time of manufacturing a pouch case 20, a recessed portion 21 is formed through the forming, and then bent by 180 degrees on the basis of a bending line 21a of the pouch case 20 to cover the recessed portion 21, thereby completing the pouch case structure. The electrode assembly 10 is inserted into the recessed portion 21.

At this time, the bending line 21a of the pouch case 20 may be formed in a portion spaced apart (G) from the edge line of the recessed portion 21. Therefore, when the pouch case 20 is bent on the basis of the bending line 21a, the folded portion of the bending line 21a adjacent to the edge line is not smoothly formed but can form a portion P protruding outward as shown in FIG. 1. This may be called a bat-ear portion.

As a result, residual stress acts on the vicinity of the edge portion of the portion P at the time of bending, and deformation of a shape different from the originally designed pouch shape may occur as shown in FIG. 1. The morphological deformation of the portion P can result in various and unnecessary morphological deformations depending on the direction and magnitude of the residual stress.

DETAILED DESCRIPTION OF THE INVENTION

Technical Problem

It is an object of the present disclosure to provide a battery cell that prevents morphological deformation of the pouch case from occurring due to residual stress, and a method for manufacturing the same.

The objects of the present disclosure are not limited to the aforementioned objects, and other objects which are not described herein should be clearly understood by those skilled in the art from the following detailed description.

Technical Solution

In order to achieve the above object, according to one embodiment of the present disclosure, there is provided a battery cell comprising: an electrode assembly including a positive electrode, a negative electrode, and a separator; and a pouch case in which a recessed portion for housing the electrode assembly is formed, wherein the pouch case is bent on the basis of at least one edge line among the edges formed by the recessed portion.

The recessed portion is recessed in a hexahedral shape, and the pouch case may be bent on the basis of one edge line among twelve edges of the hexahedral shape of the recessed portion.

The bent pouch case may seal the electrode assembly formed inside the recessed portion by bringing the case surfaces into contact with each other.

The pouch case may include aluminum.

In order to achieve the above object, according to another embodiment of the present disclosure, there is provided a method of manufacturing a battery cell comprising steps of: seating a first bent pouch case on a mold including a stepped portion and a recessed forming portion, and at least one edge line among edges of the forming portion forms a stepped line on the stepped portion, wherein the first bent pouch case is bent on basis of a bending line corresponding to the stepped line, forming the pouch case so as to have a shape of the forming portion to thereby form a recessed portion; and second bending the pouch case on the basis of the bending line to bring the case surfaces of the pouch case into contact with each other.

The method may further include a step of inserting the an electrode assembly into the recessed portion, after the step of forming the pouch case to form a recessed portion.

The method may further include a step of sealing the contacted case surfaces after the step of bringing the case surfaces of the pouch case into contact with each other.

In the step of forming the pouch case to form a recessed portion, the recessed portion may be formed so that the bending line becomes one of the edges of the recessed portion.

The first bending and the second bending may be bent at 90 degrees, respectively.

According to yet another embodiment of the present disclosure, there is provided a battery module comprising the above-mentioned battery cell.

Advantageous Effects

A battery cell and a manufacturing method thereof according to embodiments of the present disclosure provide an effect of preventing unnecessary deformation of the pouch case during manufacture of the pouch case through the mold and pouch shape capable of removing the bat-ear portion.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a view showing the state of manufacturing a pouch case of a conventional battery cell;

FIG. 2 is a view showing a state in which a pouch case is seated in a mold according to an embodiment of the present disclosure;

FIG. 3 is a view illustrating a state in which a recessed portion is formed in a pouch case according to an embodiment of the present disclosure;

FIG. 4 is a view showing a state in which the pouch case is bent according to an embodiment of the present disclosure; and FIG. 5 is a view showing a state in which the edge portion of the pouch case is manufactured in a previously designed form without deformation.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, in order to help understand the present disclosure, the accompanying drawings are not illustrated based on actual scales, but parts of the constituent elements may be exaggerated in size.

As used herein, terms such as first, second, and the like may be used to describe various components, and the components are not limited by the terms. The terms are used only to discriminate one component from another component.

Further, the terms used herein are used only to describe specific exemplary embodiments, and are not intended to limit the scope of the present disclosure. A singular expression includes a plural expression unless they have definitely opposite meanings in the context. It should be understood that the terms "comprise", "include", and "have" as used herein are intended to designate the presence of stated features, numbers, steps, constitutional elements, or combinations thereof, but it should be understood that they do not preclude a possibility of existence or addition of one or more other features, numbers, steps, constitutional elements, or combinations thereof.

Now, the battery cell according to an embodiment of the present disclosure will be described with reference to FIGS. 2 to 5.

FIG. 2 is a view showing a state in which a pouch case is seated in a mold according to an embodiment of the present disclosure. FIG. 3 is a view illustrating a state in which a recessed portion is formed in a pouch case according to an embodiment of the present disclosure. FIG. 4 is a view showing a state in which the pouch case is bent according to an embodiment of the present disclosure. FIG. 5 is a view showing a state in which the edge portion of the pouch case is manufactured in a previously designed form without deformation.

Referring to FIGS. 2 to 5, a battery cell according to an embodiment of the present disclosure includes an electrode assembly including a positive electrode, a negative electrode, and a separator, and a pouch case 200 in which a recessed portion 210 for housing the electrode assembly is formed, wherein the pouch case 200 is bent and formed on the basis of at least one edge line among the edges formed by the recessed portion 210.

The electrode assembly is stacked in the order of a positive electrode, a separator, and a negative electrode, and may be formed in a stack type, jelly-roll type, or stack-folding type structure, but according to the present embodiment, it can be formed in a rectangular parallelepiped stack type. The electrolytic solution can be inserted inside the pouch case 200, and the electrode assembly can be sealed together with the electrolytic solution inside the pouch case 200. According to the present embodiment, the pouch case can be formed of aluminum.

The recessed portion 210 can be formed on the pouch case 200. The recessed portion 210 can be formed through a forming process. The recessed portion 210 may be formed by being recessed in a hexahedral shape, and the electrode assembly may be inserted inside the recessed portion 210.

The pouch case 200 may be formed so as to cover the recessed portion 210 through bending. The bent pouch case 200 can seal the electrode assembly formed inside the recessed portion 210 by bringing the case surfaces into contact with each other.

According to the present embodiment, the pouch case 200 can be bent and formed on the basis of one edge line among twelve edges of the hexahedral shape of the recessed portion 210. Conventionally, the pouch case was bent on the basis of the bending line of the portion separated from the edge line of the recessed portion, but in that case, the shape of the folded portion was deformed due to the residual stress of the folded portion, such as the formation of a bat-ear portion in the folded portion of the bent pouch case, thus making it difficult to manufacture the pouch cell according to the shape of the previously designed pouch cell.

Thus, according to the present embodiment, among the edge lines of the recessed portion, the edge line adjacent to the folded portion is set as a bending line, and the pouch case 200 is bent, whereby the residual stress of the folded portion is minimized, the pouch cell can be manufactured according to the shape of the previously designed pouch cell, the battery cell quality can be improved, and the productivity can be secured.

Hereinafter, a method of manufacturing a battery cell according to an embodiment of the present disclosure will be described with reference to FIGS. 2 to 5.

Referring to FIGS. 2 to 5, the manufacturing method of the battery cell according to an embodiment of the present disclosure includes a step of seating a first bent pouch case 200 on a mold M including a stepped portion and a recessed forming portion F, and at least one edge line among edges of the forming portion F forms a stepped line L on the stepped portion, wherein the first bent pouch case 200 is bent on basis of a bending line 210a corresponding to the stepped line L, as shown in FIG. 2.

Then, the method includes a step of forming the pouch case 200 shown in FIG. 3 by the pressing of a forming member A so as to have a shape of the forming portion F shown in FIG. 2 to thereby form a recessed portion 210, and a step of second bending the pouch case 200 shown in FIG. 4 on the basis of the bending line 210a to bring the case surfaces of the pouch case 200 into contact with each other.

At this time, the first bending and the second bending may be bent at 90 degrees, respectively. This is because the angle of the stepped portion is formed at 90 degrees, and the pouch case 200 can be vertically seated so as to correspond to the stepped portion while forming the first bending of 90 degrees toward the mold M, and then a bending angle of 180 degrees is formed through an additional 90 degree second bending, so that the case surfaces of the pouch case 200 can be completely folded with each other.

When a pouch-type battery cell is manufactured through the above steps, it can be confirmed that the bat-ear portion P as shown in FIG. 1 is not formed in the portion of the bending line 210a of the pouch case 200, as shown in FIG. 5.

According to the present embodiment, the method may further include a step of inserting the electrode assembly 100 into the recessed portion 210, after the step of forming the pouch case 200 to form a recessed portion 210. Further, the method may further include a step of sealing the contacted case surfaces after brining the case surfaces of the pouch case 200 into contact with each other.

Further, in the step of forming the pouch case 200 to form a recessed portion 210, the recessed portion 210 may be formed so that the bending line L becomes one of the edges of the recessed portion 210. The bending line L and the corner line of the recessed portion are integrally formed, so that a morphological deformation on the folded portion cannot occur during the bending process of the pouch case 200.

The battery cells can be gathered by a plurality of numbers to constitute a battery module. In addition, a battery pack structure in which a plurality of the battery modules are assembled can be formed.

The battery pack may have a structure in which one or more of the battery modules according to the embodiment of the present disclosure are gathered, and packed together with a battery management system (BMS) and a cooling device that control and manage battery's temperature, voltage, etc.

The battery pack can be applied to various devices. Such a device may be applied to a vehicle means such as an electric bicycle, an electric vehicle, or a hybrid vehicle, but the present disclosure is not limited thereto, and is applicable to various devices that can use a battery module, which also belongs to the scope of the present disclosure.

Although preferred embodiments of the present disclosure have been shown and described above, the scope of the present disclosure is not limited thereto, and numerous other modifications and embodiments can be devised by those skilled in the art, without deviating from the spirit and scope of the invention described in the appended claims. Further, these modified embodiments should not be understood individually from the technical spirit or perspective of the present disclosure.

DESCRIPTION OF REFERENCE NUMERALS

100: electrode assembly
200: pouch case
200a: case surface
210: recessed portion
210a: bending line
M: mold
F: forming portion
L: stepped line

The invention claimed is:

1. A method of manufacturing a battery cell comprising the steps of:
   bending a pouch case a first 90 degrees about a bending line;
   then seating the pouch case on a mold including a stepped portion and a recessed forming portion, and at least one edge line among edges of the forming portion forms a stepped line on the stepped portion, wherein the bending line is aligned with and adjacent to the stepped line;
   then forming the pouch case to have a shape conformal to the forming portion, thereby forming a recessed portion of the pouch case; and
   then performing a second bending of the pouch case along the bending line a further 90 degrees to bring opposing surfaces of the pouch case into contact with each other.

2. The method according to claim 1, further comprising, after the forming of the recessed portion of the pouch case, inserting the electrode assembly into the recessed portion of the pouch case.

3. The method according to claim 1, further comprising, after the performing of the second bending of the pouch case, sealing the opposing surfaces to one another.

4. The method according to claim 1, wherein, during the forming of the recessed portion of the pouch case, the recessed portion is formed so that the bending line becomes one edge of the recessed portion of the pouch case.

5. The method according to claim 1, wherein the stepped line is a vertex of a 90 degrees angle between a vertically extending surface of the stepped portion and a horizontally extending surface of the stepped portion.

* * * * *